United States Patent
Yokoyama

(10) Patent No.: US 9,736,387 B2
(45) Date of Patent: Aug. 15, 2017

(54) IRRADIATION DEVICE, IRRADIATION METHOD, AND PROGRAM FOR SWITCHING IRRADIATION REGIONS

(71) Applicant: SONY CORPORATION, Tokyo (JP)

(72) Inventor: Tomonori Yokoyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/324,348

(22) Filed: Jul. 7, 2014

(65) Prior Publication Data
US 2015/0022715 A1    Jan. 22, 2015

(30) Foreign Application Priority Data
Jul. 17, 2013  (JP) .................................. 2013-148770

(51) Int. Cl.
*H04N 5/222* (2006.01)
*H04N 5/235* (2006.01)
*H04N 5/353* (2011.01)

(52) U.S. Cl.
CPC ......... *H04N 5/2353* (2013.01); *H04N 5/2354* (2013.01); *H04N 5/3532* (2013.01)

(58) Field of Classification Search
CPC ... H04N 5/2353; H04N 5/3532; H04N 5/2354
USPC ............................................... 348/333.1, 370
See application file for complete search history.

(56) References Cited

U.S. PATENT DOCUMENTS

| | | | |
|---|---|---|---|
| 2004/0061838 A1* | 4/2004 | Mochizuki et al. ............ 353/69 |
| 2006/0013510 A1* | 1/2006 | Day .............................. 382/312 |
| 2009/0073275 A1* | 3/2009 | Awazu ..................... G03B 7/16 348/222.1 |
| 2012/0049078 A1* | 3/2012 | Senda ...................... H04N 5/32 250/370.09 |
| 2012/0207452 A1* | 8/2012 | Wang et al. .................. 386/280 |
| 2013/0064531 A1* | 3/2013 | Pillman et al. .... H04N 5/23296 396/62 |
| 2013/0141618 A1* | 6/2013 | Kobayashi ......... H04N 5/23241 348/301 |

FOREIGN PATENT DOCUMENTS

JP    2002-344775 A    11/2002

* cited by examiner

*Primary Examiner* — Usman Khan
(74) *Attorney, Agent, or Firm* — Chip Law Group

(57) ABSTRACT

There is provided an irradiation device including an irradiation unit configured to emit light, and an irradiation control unit configured to switch irradiation regions irradiated with the light by the irradiation unit according to a synchronization signal for controlling an exposure period of a pixel of an imaging device of an imaging unit.

13 Claims, 16 Drawing Sheets

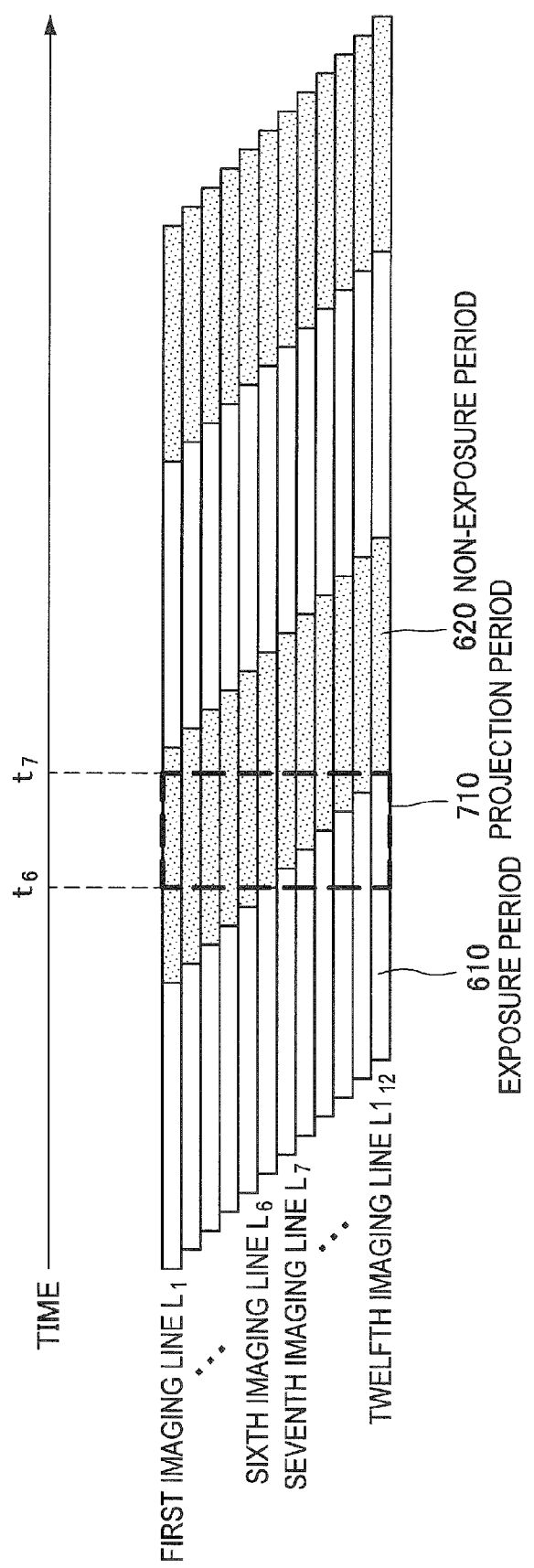

IRRADIATION DEVICE, IRRADIATION METHOD, AND PROGRAM FOR SWITCHING IRRADIATION REGIONS

CROSS REFERENCE TO RELATED APPLICATIONS

This application claims the benefit of Japanese Priority Patent Application JP 2013-148770 filed Jul. 17, 2013, the entire contents of which are incorporated herein by reference.

BACKGROUND

The present disclosure relates to an irradiation device which emits light to a region where an image is captured by an imaging unit, an irradiation method, and a program.

A technology is proposed by which when video camera or the like captures video, light or the like indicating the location of a subject is emitted in such a manner as to prevent the light from being taken in the captured video.

For example, JP 2002-344775A discloses a technology by which when video is captured by using a video camera, illumination light is emitted in a period from taking a captured subject image to taking a next subject image in such a manner as to prevent the emitted illumination light from being taken in the captured video.

SUMMARY

Meanwhile, many CMOS image sensors configured to cause pixels to be exposed to light in different exposure periods have been used as imaging devices of consumer video cameras in recent years. Generally, each CMOS image sensor serially resets accumulated charges of the plurality of pixels for each line having a pixel group arranged therein. After a certain exposure time passes after the reset of the accumulated charges, the CMOS image sensor serially reads the accumulated charges for each line having the pixels arranged therein.

However, when such an imaging device is used, a non-exposure period of a certain pixel group overlaps with an exposure period of another pixel group. Accordingly, the technology disclosed in JP 2002-344775A causes the illumination light to be taken in a captured image.

In light of the foregoing, it is desirable to provide an irradiation device, an irradiation method, and a program which are novel and improved, and which can emit light in such a manner as to prevent the light from being taken in a captured image.

According to an embodiment of the present disclosure, there is provided an irradiation device which includes an irradiation unit configured to emit light, and an irradiation control unit configured to switch irradiation regions irradiated with the light by the irradiation unit according to a synchronization signal for controlling an exposure period of a pixel of an imaging device of an imaging unit.

The imaging unit may cause a plurality of the pixels to be exposed to light in different exposure periods, and the irradiation control unit may switch the irradiation regions based on imaging regions used for imaging by the pixels and the exposure periods of the pixels.

The irradiation control unit may switch the irradiation regions to emit the light to the imaging regions of the pixels that are in non-exposure periods.

The irradiation unit may project an image on the irradiation regions by emitting the light.

The irradiation control unit may switch the irradiation regions by causing the irradiation unit to project one of a display region and a non-display region of the image in a switching manner.

The non-display region may result from region replacement in the image with a black region by the irradiation control unit.

The irradiation unit may project the image at a frame rate that is an integral multiple of a frame rate used for the imaging unit.

The irradiation control unit may change an amount of light from the irradiation unit based on a length of the exposure period of the pixel.

The irradiation device may further include an imaging unit having the irradiation regions included in imaging regions and configured to output the synchronization signal to the irradiation control unit.

According to another embodiment of the present disclosure, there is provided an irradiation method including emitting light, and switching irradiation regions irradiated with the light according to a synchronization signal for controlling an exposure period of a pixel of an imaging device of an imaging unit.

According to another embodiment of the present disclosure, there is provided a program for causing a computer to implement emitting light, and switching irradiation regions irradiated with the light according to a synchronization signal for controlling an exposure period of a pixel of an imaging device of an imaging unit.

According to the embodiments of the present disclosure described above, it is possible to emit the light in such a manner as to prevent the light from being taken in a captured image.

BRIEF DESCRIPTION OF THE DRAWINGS

FIG. 7 is an explanatory diagram illustrating a relationship between operation of the imaging device according to the embodiment and a projection period in a reference example;

DETAILED DESCRIPTION OF THE EMBODIMENT

Figure 1:
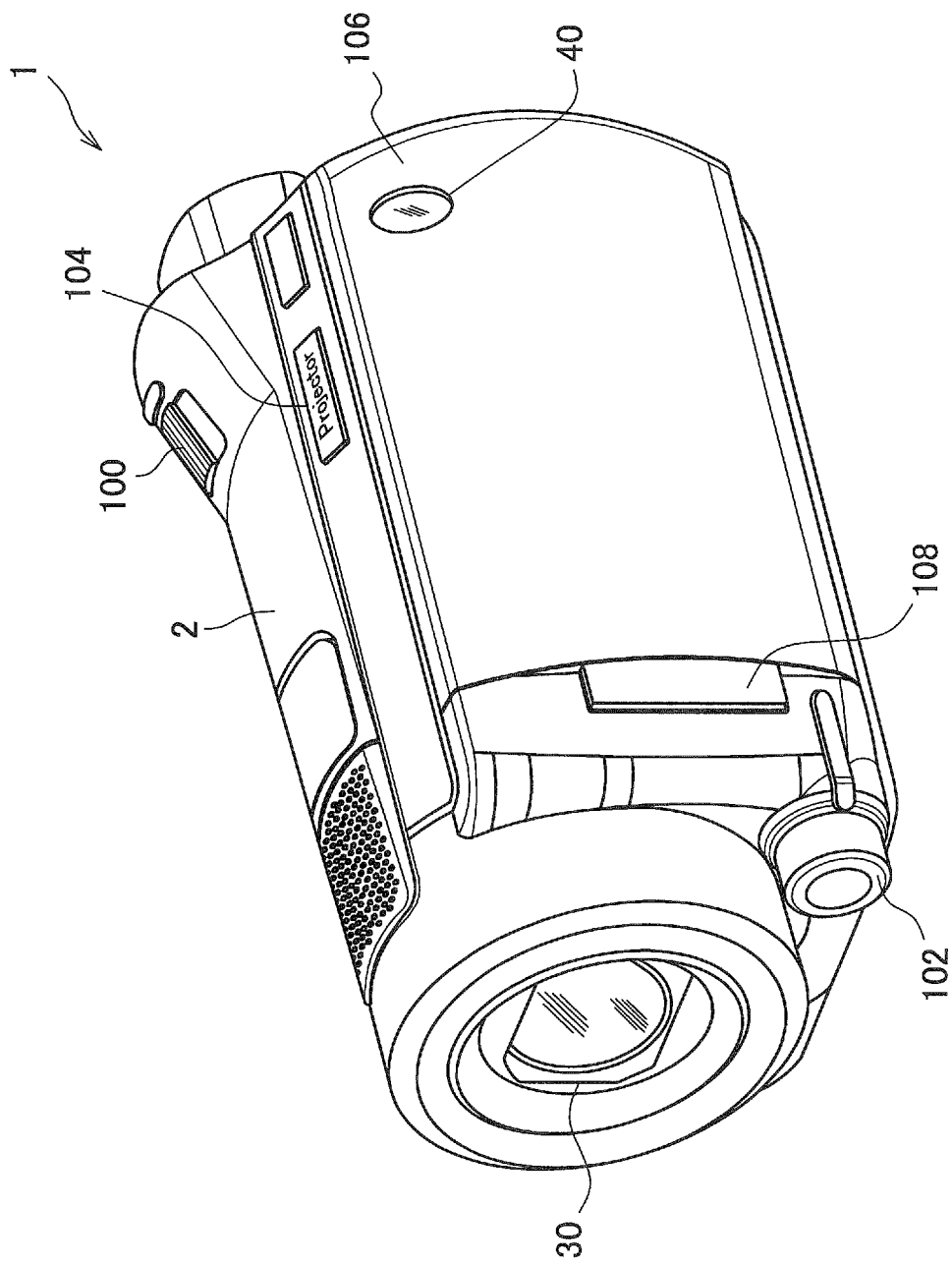
FIG. 1 is a perspective diagram illustrating an external appearance of a projector according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

1. Configuration of Projector According to Embodiment of Present Disclosure
  1-1. External Structure Explanation
  1-2. Detailed Configuration Explanation
2. Operation Example of Imaging Device
3. Operation Example of Projector According to Embodiment of Present Disclosure
  3-1. Explanation of Imaging Operation and Projection Operation
  3-2. Explanation of Methods for Controlling Imaging Operation and Projection Operation
4. Modifications
4-1. First Modification
4-2. Second Modification
5. Conclusion

1. BASIC CONFIGURATION OF PROJECTOR ACCORDING TO EMBODIMENT OF PRESENT DISCLOSURE

[1-1. External Structure Explanation]

Firstly, the external structure of a projector 1 according to an embodiment of the present disclosure will be described with reference to FIGS. 1 and 2.

Figure 2:
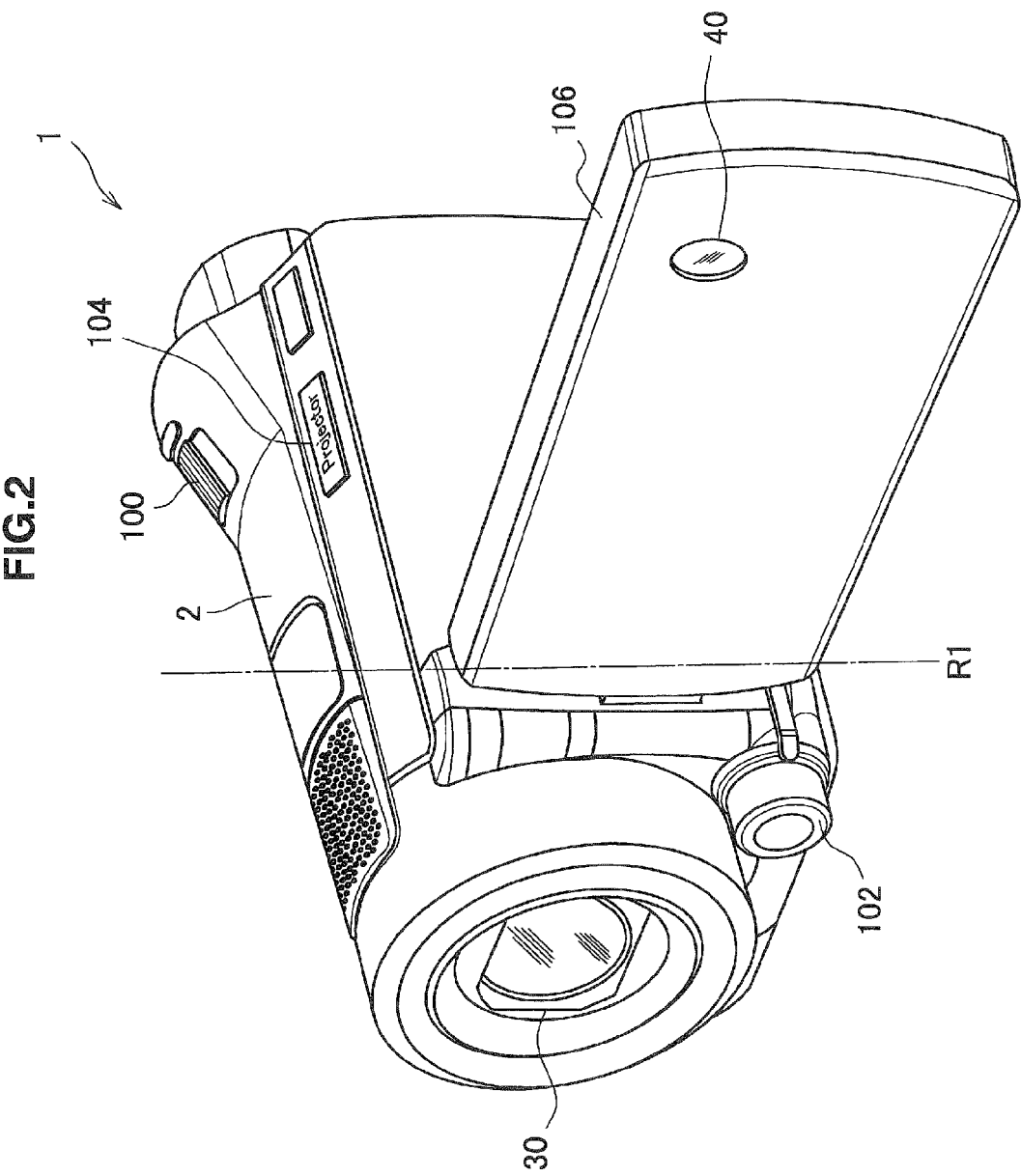
FIG. 2 is a perspective diagram illustrating an external appearance of the projector according to the embodiment.

FIGS. 1 and 2 are perspective diagrams illustrating external appearances of the projector 1 according to an embodiment of the present disclosure. As illustrated in FIG. 1, the projector 1 includes, for example, a body 2, an opening/closing unit 106, and a hinge unit 108. Note that FIGS. 1 and 2 show the projector 1 (a video camera having a projection function) as an example of an irradiation device, but the irradiation device is not limited to the example. For example, the irradiation device may be a digital camera, a mobile game machine, a media player, a notebook computer, or the like. The irradiation device may be an information processing apparatus or an information processing terminal, such as a smartphone or a tablet terminal, having a GPS (Global Positioning System) function, a touch panel, or the like.

The body 2 includes, for example, an imaging unit 30, a projection unit 40, a zoom manipulation unit 100, a manual manipulation unit 102, and a projection-switching manipulation unit 104.

The imaging unit 30 includes a lens and a zoom lens that gather light from a subject, forms a subject image on an imaging device, and thereby captures the image. The detailed configuration of the imaging unit 30 will be described later with reference to FIGS. 3 and 4.

The projection unit 40 is a projector module that projects an image, for example, by emitting light from a light source through a display device. The detailed configuration of the projection unit 40 will be described later with reference to FIGS. 3 and 5.

The zoom manipulation unit 100 receives the user's manipulation for changing a focal length of the lens or the like of the imaging unit 30. The zoom manipulation unit 100 includes a lever that can be tilted to, for example, the WIDE side and the TELE side, as illustrated in FIG. 1. In this case, the imaging unit 30 makes the focal length shorter (reduces the subject image) when the lever is tilted to the WIDE side, and makes the focal length longer (enlarges the subject image) when the lever is tilted to the TELE side.

The manual manipulation unit 102 receives the user's manipulation for focusing the lens or the like of the imaging unit 30. The manual manipulation unit 102 includes a dial that is rotatable, for example, clockwise and anticlockwise, as illustrated in FIG. 1. In this case, the imaging unit 30 adjusts the location of the focal point according to a rotation direction and a rotation amount of the dial.

The projection-switching manipulation unit 104 receives the user's manipulation for switching whether or not to project a projection image from the projection unit 40. In this case, the projector 1 switches whether or not to project the projection image from the projection unit 40 according to a pressing pressure applied to the button of the projection-switching manipulation unit 104.

The configuration of the body 2 of the projector 1 has heretofore been described. Next, a description is given of the opening/closing unit 106 coupled to the body 2 with the hinge unit 108 as a coupling unit placed in between.

The opening/closing unit 106 is coupled to the body 2 to be able to open and close around an opening/closing axis R1 by using a hinging mechanism of the hinge unit 108, the opening/closing axis R1 being formed in a vertical direction of the projector 1 shown in FIG. 2. FIG. 1 shows a basic rest state (a closed state) where the opening/closing unit 106 is closed with respect to the body 2 in such a manner that the projection unit 40 faces outward with the back of the projection unit 40 against the body 2. FIG. 2 shows a basic projection state (an opened state) where the opening/closing unit 106 is opened with respect to the body 2 by rotating around the opening/closing axis R1. When being in the basic state shown in FIG. 2, the projector 1 can thereby project the projection image from the projection unit 40 on an imaging region of the imaging unit 30.

The description has heretofore been given of the external structure of the projector 1 according to an embodiment of the present disclosure. Next, a detailed configuration of the projector 1 according to the present embodiment will be described with reference to FIGS. 3 to 5.

[1-2. Detailed Configuration Explanation]

Figure 3:
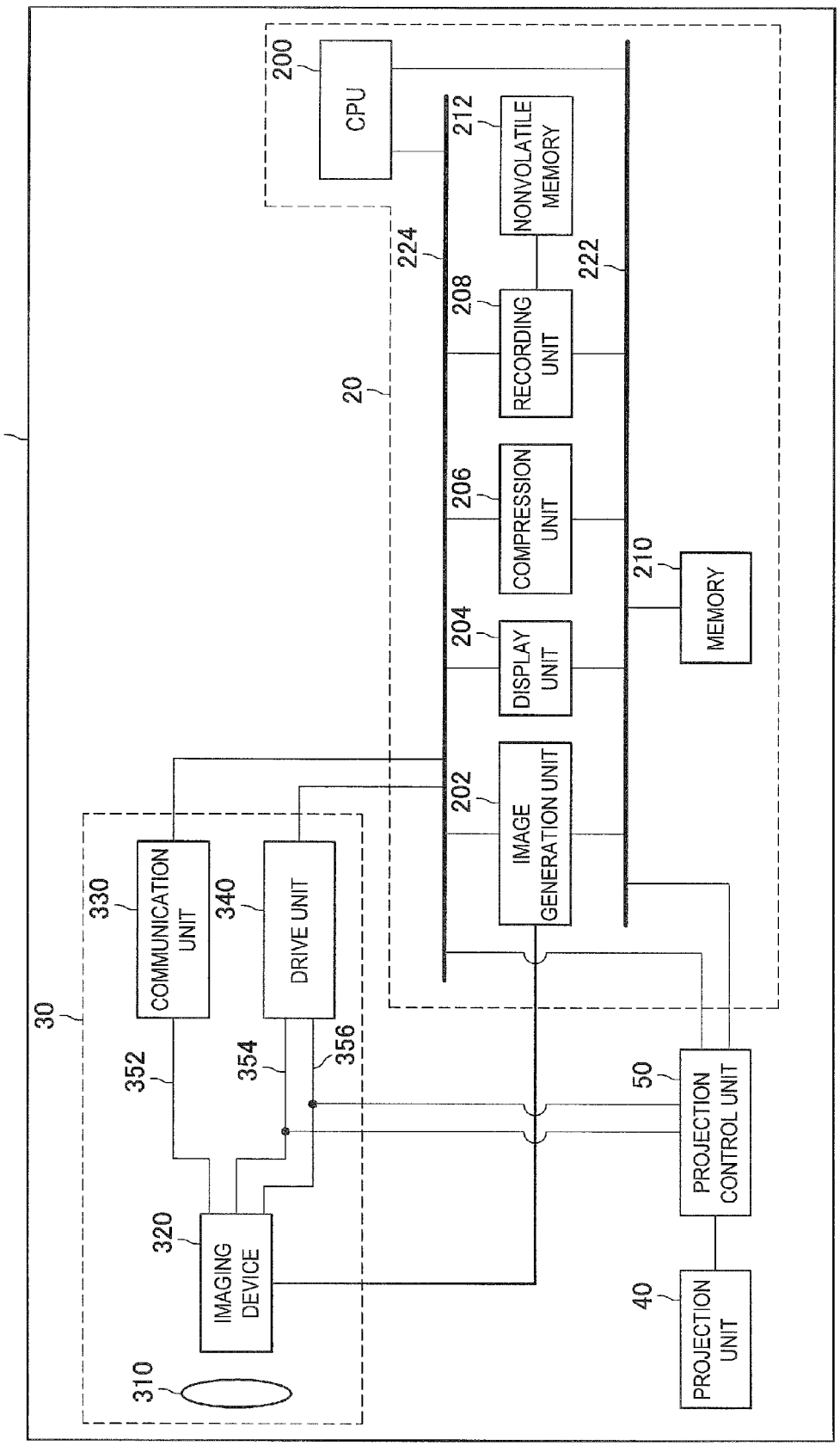
FIG. 3 is a block diagram illustrating a configuration of the projector according to the embodiment.

FIG. 3 is a block diagram illustrating the configuration of the projector 1 according to the present embodiment. With reference to FIG. 3, the projector 1 includes a control unit 20, the imaging unit 30, the projection unit 40, and a projection control unit 50 that is an example of an irradiation control unit.

The control unit 20 controls, for example, projection operation and imaging operation of the projector 1. The control unit 20 includes, for example, a CPU (Central Processing Unit) 200, an image generation unit 202, a display unit 204, a compression unit 206, a recording unit 208, a memory 210, a nonvolatile memory 212, a memory bus 222, and a control bus 224.

The CPU 200 generates image data of a projection image to be projected, for example, by the projection unit 40 and stores the image data in the memory 210. Note that the CPU 200 may copy image data recorded in advance in the nonvolatile memory 212 to the memory 210, as a projection image. The CPU 200 also controls, through the control bus 224, operations of the imaging unit 30, the projection control unit 50, the image generation unit 202, the display unit 204, the compression unit 206, and the recording unit 208. Further, the CPU 200 reads, through the control bus 224, image characteristics information acquired by the image generation unit 202 to be described later. The image characteristics information is characteristics information on image data and includes at least brightness information of the image data.

From captured-image data outputted from an imaging device 320 of the imaging unit 30 to be described later, the image generation unit 202 generates display-image data and recording-image data that have the data type and/or the number of pixels different from those of the captured image data. The display- and recording-image data are image data expressed by using: RGB; or luminance and chrominance. The image generation unit 202 stores the generated display- and recording-image data in the memory 210. The image generation unit 202 also acquires image characteristics information from the captured-image data outputted from the imaging device 320.

The display unit 204 includes, for example, an LCD (Liquid Crystal Display) or an organic EL (Electro Luminescence) display. The display unit 204 may be provided on the opposite side of the opening/closing unit 106 of the projector 1 from the projection unit 40, the projector 1 being illustrated, for example, in FIG. 2. The display unit 204 reads and displays the display-image data generated by the image generation unit 202 and stored in the memory 210.

The compression unit 206 reads the recording-image data generated and stored in the memory 210 by the image generation unit 202, compresses the read recording-image data, thereby generates compressed-image data, and stores the compressed-image data in the memory 210.

The recording unit 208 reads the compressed-image data generated and stored in the memory 210 by the compression unit 206 and stores the compressed-image data in the nonvolatile memory 212.

The nonvolatile memory 212 includes, for example, a semiconductor memory, a HDD (Hard Disk Drive), or the like. The nonvolatile memory 212 may be a storage medium attachable to and detachable from the projector 1.

The memory 210 includes, for example, an SDRAM (Synchronous Dynamic Random Access Memory) or the like, and is used as a work area for storing and generating image data.

The detailed configuration of the control unit 20 has heretofore been described. Next, the detailed configuration of the imaging unit 30 will be described with reference to FIGS. 3 and 4.

With reference to FIG. 3, the imaging unit 30 includes an imaging lens 310, the imaging device 320, a communication unit 330, a drive unit 340, a serial communication bus 352, a vertical-synchronization-signal transmission bus 354, and a horizontal-synchronization-signal transmission bus 356.

The imaging lens 310 gathers light from the subject and forms a subject image on the imaging device 320. Although being not shown in the figure, a zoom lens may be provided between the imaging lens 310 and the imaging device 320. The zoom lens can enlarge or reduce the subject image by changing the location of the lens in accordance with a manipulation detected by the zoom manipulation unit 100.

The imaging device 320 performs photoelectric conversion and analog-to-digital conversion on the subject image formed by the imaging lens 310 by using a plurality of pixels arranged in a matrix form, and generates captured-image data. The imaging device 320 outputs the generated captured-image data to the image generation unit 202. The imaging device 320 may be formed on a single semiconductor substrate or a plurality of semiconductor substrates. Here, a configuration of the imaging device 320 will be described in detail with reference to FIG. 4.

Figure 4:
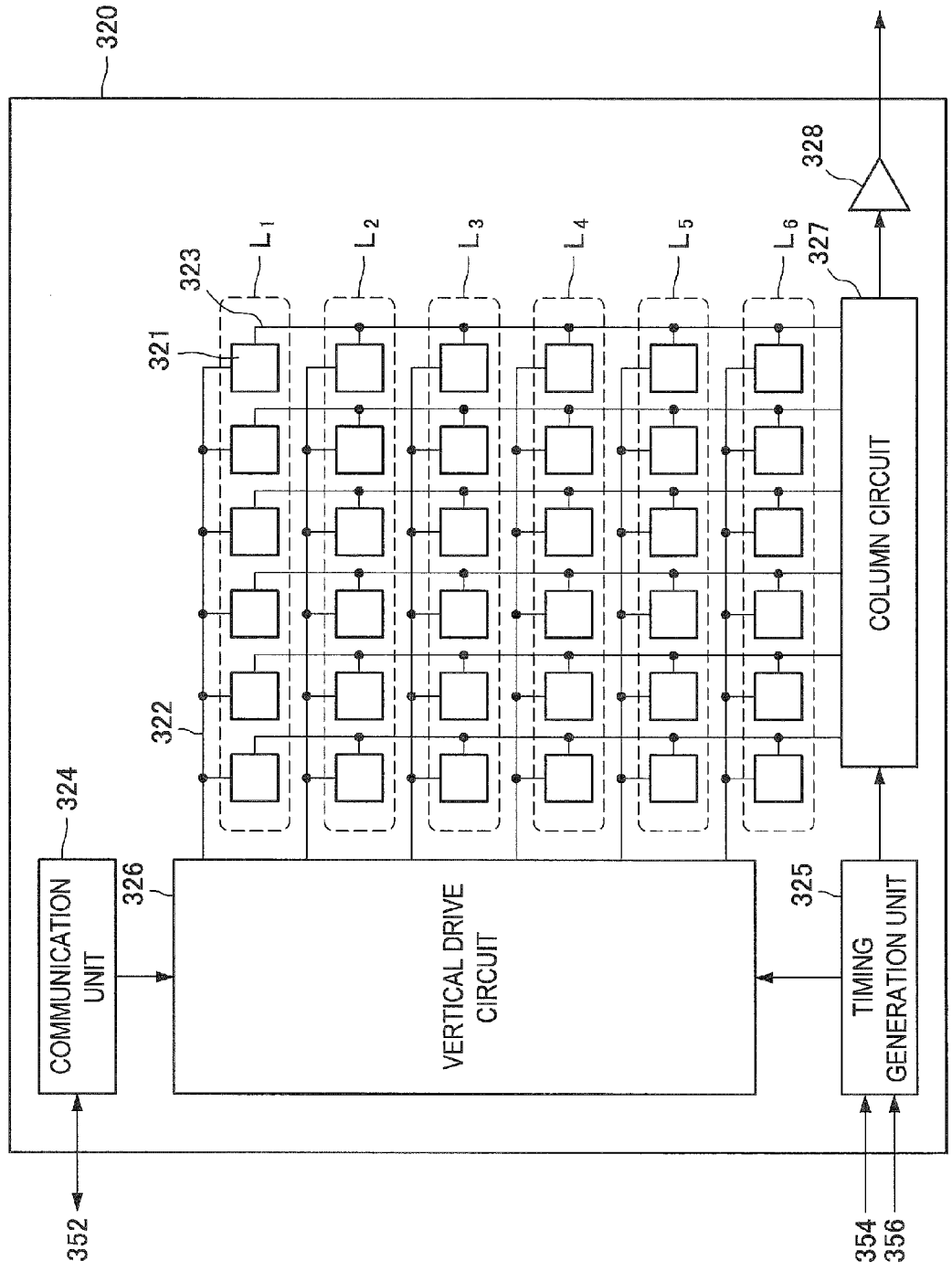
FIG. 4 is a block diagram illustrating a configuration of an imaging device according to the embodiment.

FIG. 4 is a block diagram illustrating the configuration of the imaging device 320 according to the present embodiment. With reference to FIG. 4, the imaging device 320 includes, for example, pixels 321, control lines 322, vertical signal lines 323, a communication unit 324, a timing generation unit 325, a vertical drive circuit 326, a column circuit 327, and an output driver 328. Further, the plurality of pixels 321 are divided into a plurality of imaging lines L. For example, in the example illustrated in FIG. 4, the pixels 321 are divided into six imaging lines L that are a first imaging line $L_1$ to a sixth imaging line $L_6$ based on lines where the pixels 321 are arranged.

The imaging device 320 according to the present embodiment is an image sensor, such as a CMOS image sensor, that causes the pixels 321 to be exposed to light by using different exposure periods. For example, the imaging device 320 that is the CMOS image sensor serially resets charges of the pixels 321 of the imaging lines L for each imaging line L, and serially reads the accumulated charges for each imaging line L after the elapse of a predetermined exposure time.

Each pixel 321 performs photoelectric conversion of light incident from the imaging lens 310 and accumulates resultant charges. The pixel 321 also outputs pixel information corresponding to the accumulated charges. Further, the pixel 321 discards the accumulated charges to reset the accumulated charges. The pixels 321 are arranged in the matrix form and connected to the control lines 322 and the vertical signal lines 323, the control lines 322 transmitting charge reset signals and pixel-information output signals, the vertical signal lines 323 transmitting the pixel information to the column circuit 327. Upon receipt of a charge reset instruction from the vertical drive circuit 326, each pixel 321 resets the charges. Upon receipt of an image-information output instruction from the vertical drive circuit 326, the pixel 321 outputs pixel information corresponding to the accumulated charges to the column circuit 327 through the corresponding vertical signal line 323. The pixel 321 may include a floating diffusion amplifier to output a voltage value as pixel information corresponding to the accumulated charges.

The control lines 322 are connected to the pixels 321 and the vertical drive circuit 326, and transmit, to the pixels 321, reset signals for resetting the charges of the pixels 321 and pixel information output signals, the reset and output signals being issued from the vertical drive circuit 326. Each control line 322 is connected to a corresponding group of the pixels 321 belonging to the same line.

The vertical signal lines 323 are connected to the pixels 321 and the column circuit 327, and transmit, to the column circuit 327, the pixel information outputted from the pixels 321. Each vertical signal line 323 is connected to a corresponding group of the pixels 321 belonging to the same column.

The communication unit 324 stores set values for operations of the imaging device 320, and rewrites any of the set values when receiving a set-value rewrite request from the communication unit 330. The communication unit 324 also transmits any of the set values to the communication unit 330 in response to a set-value read request from the communication unit 330. The set values include at least an electronic-shutter-timing set value indicating timing for an electronic shutter. The communication unit 324 outputs the electronic-shutter-timing set value to the vertical drive circuit 326.

The timing generation unit 325 generates vertical synchronization pulses and horizontal synchronization pulses, based on a vertical synchronization signal and a horizontal synchronization signal that are transmitted from the drive unit 340 through the vertical-synchronization-signal transmission bus 354 and the horizontal-synchronization-signal transmission bus 356. The timing generation unit 325 outputs the generated vertical and horizontal synchronization pulses to the vertical drive circuit 326 and the column circuit 327. The timing generation unit 325 detects, for example, falling edges of the vertical and horizontal synchronization signals to generate the vertical and horizontal synchronization pulses.

The vertical drive circuit 326 includes a read-line counter indicating one of the lines of the pixels 321 from which pixel information is to be read. Upon receipt of a horizontal synchronization pulse from the timing generation unit 325, the vertical drive circuit 326 selects the line of the pixels 321 according to the value of the read-line counter, and instructs, through the control lines 322, the pixels 321 to output pixel information to the column circuit 327. Upon completion of issuing the instruction to the pixels 321, the vertical drive circuit 326 increments or decrements the value of the read-line counter. Upon receipt of a vertical synchronization pulse from the timing generation unit 325, the vertical drive circuit 326 sets a predetermined initial value in the read-line counter. The vertical drive circuit 326 further includes a reset-line counter indicating one of the lines of the pixels 321 where charges are to be reset. After receiving a vertical synchronization pulse and then horizontal synchronization pulses the number of which matches the electronic-shutter-timing set value outputted from the communication unit 324, the vertical drive circuit 326 issues an instruction for resetting accumulated charges for each line every time the vertical drive circuit 326 receives a horizontal synchronization pulse. The instruction for resetting the accumulated charges is issued for each line selected according to the value of the reset-line counter. The vertical drive circuit 326 also increments or decrements the value of the reset-line counter after the reset instruction. After receiving the vertical synchronization pulse and then horizontal synchronization pulses the number of which matches the electronic-shutter-timing set value outputted from the communication unit 324, the vertical drive circuit 326 sets a predetermined initial value in the reset-line counter.

The predetermined initial values set in the respective read-line and reset-line counters may be outputted from the communication unit 324 to be changeable from outside of the imaging device 320. Whether to increment or decrement the values of the respective read-line and reset-line counters may be selectable. In this case, selection conditions for incrementing or decrementing the values may be outputted from the communication unit 324 to thereby be changeable from outside of the imaging device 320.

Upon receipt of a horizontal synchronization pulse from the timing generation unit 325, the column circuit 327 samples and holds a plurality of pieces of pixel information outputted from the pixels 321 for each vertical signal line 323. Thereafter, the column circuit 327 converts the pieces of the acquired pixel information into digital data by performing analog-to-digital conversion. It is thereby possible to acquire a plurality of digital data pieces of accumulated charges of the pixels 321 belonging to one line. The column circuit 327 serially outputs the acquired digital data pieces to the output driver 328.

The output driver 328 serially outputs the digital data pieces received from the column circuit 327, to the control unit 20.

The communication unit 330 shown in FIG. 3 communicates with the imaging device 320 through the serial communication bus 352 to write a set value related to the operation of the imaging device 320 to the imaging device 320 and to read a set value in the imaging device 320. The communication unit 330 can perform the communication, for example, in a method conforming to the I2C standard.

The drive unit 340 generates and outputs synchronization signals for causing the imaging device 320 to capture an image and to output the digital image data pieces. The synchronization signals are, for example, vertical synchronization signals transmitted through a vertical-synchronization-signal transmission bus and horizontal synchronization signals transmitted through a horizontal-synchronization-signal bus.

The detailed configuration of the imaging unit 30 has heretofore been described. Next, the detailed configurations of the projection unit 40 and the projection control unit 50 will be described with reference to FIGS. 3 and 5.

Figure 5:
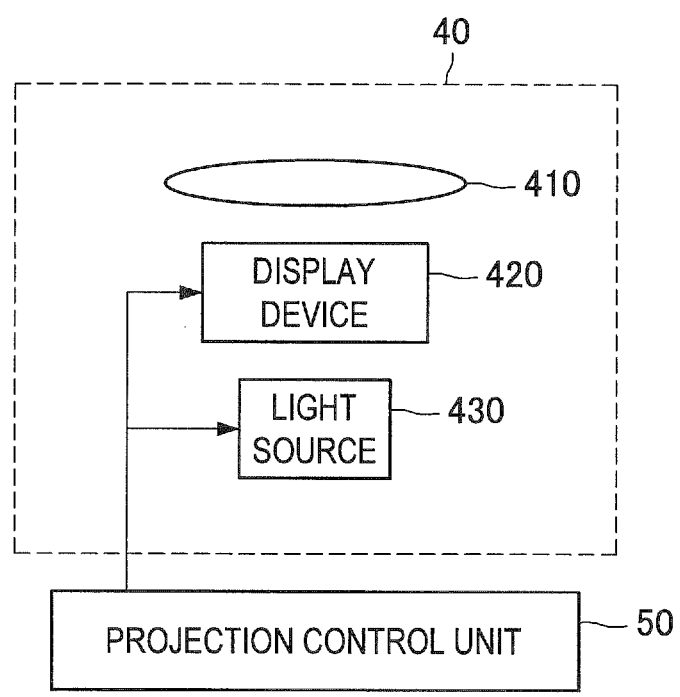
FIG. 5 is a block diagram illustrating a configuration of a projection unit according to the embodiment.

FIG. 5 is a block diagram illustrating a configuration of the projection unit according to the present embodiment. With reference to FIG. 5, the projection unit 40 includes a projection lens 410, a display device 420, and a light source 430.

The light source 430 includes: white LEDs (Light Emitting Diodes) emitting white light; and an optical system that diffuses and outputs the light emitted from the white LEDs to the display device 420. Although the description will be given in the present embodiment focused on an example in which the light source 430 includes the white LEDs, but the configuration of the light source 430 is not limited to the example. For example, the light source 430 may include a high-pressure mercury lamp.

The display device 420 is a liquid crystal panel that displays a projection image. The display device 420 includes, for example, a trans missive liquid crystal, a reflective liquid crystal, a DMD (Digital Mirror Device), or the like. The light emitted from the light source 430 is transmitted through a screen displayed on the display device 420 onto the projection lens 410.

The projection lens 410 projects a projection image by sending the screen onto a projection surface.

Note that the projector 1 stores a correspondence between the pixels 321 of the imaging device 320 and the pixels of the display device 420. The correspondence between the pixels 321 of the imaging device 320 and the pixels of the display device 420 may be, for example, manually set by the user or may be set in advance based on the location, of the zoom lens, serving as a reference. In addition, the CPU 200 or the projection control unit 50 may control a projection region based on the location of the zoom lens or the angle of view of the imaging unit 30.

2. OPERATION EXAMPLE OF IMAGING DEVICE

Figure 6:
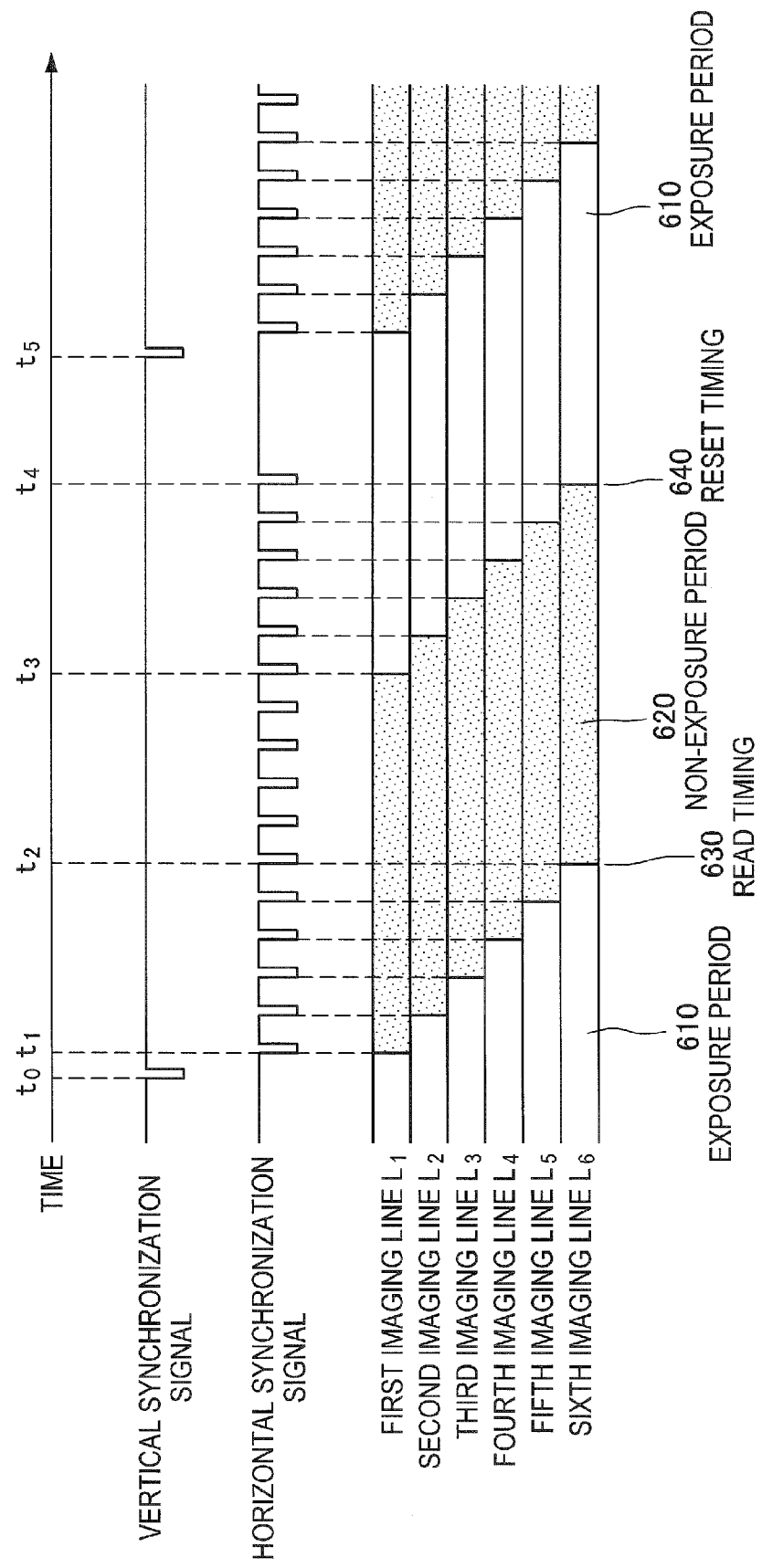
FIG. 6 is an explanatory diagram illustrating operation of the imaging device according to the embodiment.

The detailed configuration of the projection unit 40 has heretofore been described. Next, an example of operation of the imaging device 320 will be described with reference to FIG. 6. FIG. 6 is an explanatory diagram illustrating operation of the imaging device 320 according to the present embodiment.

Firstly, the drive unit 340 lowers a vertical synchronization signal to be transmitted to the timing generation unit 325 through the vertical-synchronization-signal transmission bus 354 (time $t_0$). The timing generation unit 325 detects the falling of the vertical synchronization signal and generates a vertical synchronization pulse. The timing generation unit 325 sends the generated vertical synchronization pulse to the vertical drive circuit 326. Upon receipt of the vertical synchronization pulse, the vertical drive circuit 326 sets the predetermined initial value in the read-line counter indicating the line of pixels from which pixel information is to be read. In the example illustrated in FIG. 6, the value of the read-line counter indicating the first imaging line $L_1$ is set at time $t_0$.

Next, the drive unit 340 lowers a horizontal synchronization signal to be transmitted to the timing generation unit 325 through the horizontal-synchronization-signal transmission bus 356 (time $t_1$). The timing generation unit 325 detects the falling of the horizontal synchronization signal and generates a horizontal synchronization pulse. The timing generation unit 325 sends the generated horizontal synchronization pulse to the vertical drive circuit 326 and the column circuit 327. Upon receipt of the horizontal synchronization pulse, the vertical drive circuit 326 causes the pixels 321 included in the imaging line corresponding to the value of the read-line counter to output pixel information of the pixels 321 to the column circuit 327 through the vertical signal lines 323. In the example illustrated in FIG. 6, the vertical drive circuit 326 instructs, at time $t_1$, the pixels 321 included in the first imaging line $L_1$ to output pixel information of the pixels 321. Further, the vertical drive circuit 326 increments or decrements the value of the read-line counter after instructing the pixels 321 to output the pixel information. In the example illustrated in FIG. 6, the vertical drive circuit 326 instructs, at time $t_1$, the pixels 321 in the first imaging line $L_1$ to output the pixel information and thereafter increments or decrements the value of the read-line counter to set the value indicating the second imaging line $L_2$.

Upon receipt of the horizontal synchronization pulse, the column circuit 327 samples and holds the pixel information outputted from the pixels 321 for each vertical signal line 323 and thereafter converts the pixel information into digital data. In the example illustrated in FIG. 6, when receiving the horizontal synchronization signal at time $t_2$ and then the pixel information of the pixels 321 included in the first imaging line $L_1$, the column circuit 327 samples and holds the pixel information for each vertical signal line 323. The column circuit 327 performs analog-to-digital conversion on the held pixel information of the pixels 321 included in the first imaging line $L_1$ to obtain digital data. The digital data resulting from the conversion is outputted to the image generation unit 202 through the output driver 328.

Further, the drive unit 340 lowers the horizontal synchronization signal to be transmitted to the timing generation unit 325 a plurality of times at predetermined intervals (from time $t_2$ to time $t_4$). In the period between time $t_1$ and time $t_2$ illustrated in FIG. 6, the reading of the pixel information for each imaging line L, the conversion, and the output which are described above are serially performed from the first imaging line $L_1$ to the sixth imaging line $L_6$. The digital data of the pixel information of all of the pixels 321 included in the first imaging line $L_1$ to the sixth imaging line $L_6$ are thereby outputted to the image generation unit 202.

After receiving the vertical synchronization pulse and the horizontal synchronization pulses of which number matches the electronic-shutter-timing set value, the vertical drive circuit 326 sets the initial value in the reset-line counter. In the example illustrated in FIG. 6, the vertical drive circuit 326 sets the value of the reset-line counter as the initial value indicating the first imaging line $L_1$, at time $t_3$. Thereafter, the vertical drive circuit 326 instructs the pixels 321 included in the line selected based on the value of the reset-line counter to reset the accumulated charges. In the example illustrated in FIG. 6, the vertical drive circuit 326 instructs, at time $t_3$, the pixels 321 included in the imaging line $L_1$ to reset the accumulated charges. Further, the vertical drive circuit 326 instructs the pixels 321 to reset the accumulated charges and thereafter increments or decrements the value of the reset-line counter. In the example illustrated in FIG. 6, the vertical drive circuit 326 instructs the pixels 321 to reset the accumulated charges at time $t_3$ and thereafter increments or decrements the value of the reset-line counter to set the value indicating the second imaging line $L_2$.

In the period between time $t_3$ and time $t_4$ illustrated in FIG. 6, the aforementioned resetting of the accumulated charges for each imaging line L is serially performed from the imaging line $L_1$ to the sixth imaging line $L_6$. The accumulated charges of all of the pixels 321 included in the first imaging line $L_1$ to the sixth imaging line $L_6$ are thereby reset.

When imaging is thereafter performed in succession, the drive unit 340 lowers the vertical synchronization signal (time $t_5$) and repeats the series of operations from time $t_0$.

A period from resetting the accumulated charges of the pixels to outputting the pixel information is an exposure period in each imaging line L. An image resulting from light receiving in this period is reflected on digital image data outputted by the imaging device 320 to the image generation unit 202. In contrast, a period from outputting the pixel information to resetting the accumulated charges of the pixels is a non-exposure period in the imaging line L. An image resulting from light receiving in this period is subjected to the photoelectric conversion, and charges are temporarily accumulated. However, the accumulated charges are reset, and thus the image is not reflected on the digital image data outputted by the imaging device 320 to the image generation unit 202.

The example of the operation of the imaging device has heretofore been described. Next, a reference example of projector operation will be described with reference to FIGS. 7 to 8D.

FIG. 7 is an explanatory diagram illustrating a relationship between operation of the imaging device 320 according to the present embodiment and a projection period in a reference example. Although the imaging device 320 in FIG. 7 has more imaging lines L that are a first imaging line $L_1$ to a twelfth imaging line $L_{12}$ than in the example illustrated in FIG. 6, the configuration other than this and the operation are the same as those in the example illustrated in FIG. 6.

In the projection method in the reference example, light is emitted to imaging regions from the first imaging line $L_1$ in a non-exposure period of the first imaging line $L_1$, so that an image is projected. At this time, the image is projected on the entire imaging regions. In the example illustrated in FIG. 7, the image is projected in a period between time $t_6$ and time $t_7$. At this time, the period between time $t_6$ and time $t_7$ in each of the first imaging line $L_1$ to the sixth imaging line $L_6$ is a non-exposure period, and thus the projected image is not reflected on the digital image data. However, the periods between time $t_6$ and time $t_7$ in the seventh imaging line $L_7$ to the twelfth imaging line $L_{12}$ include exposure periods, and thus the projected image is taken in the digital image data.

Figure 8A:
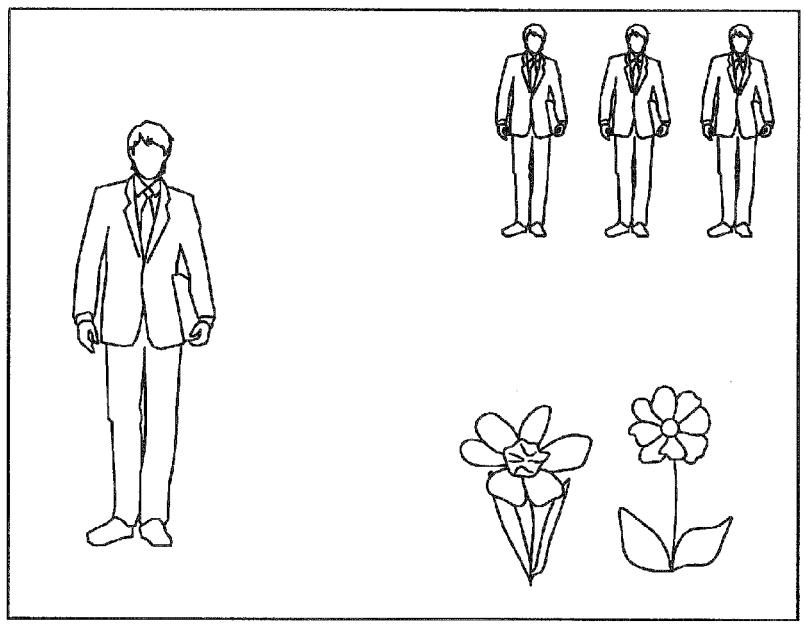
FIG. 8A is an explanatory diagram illustrating subject images captured by the imaging unit.

FIGS. 8A to 8D are each an explanatory diagram illustrating a projection example using the projection method in FIG. 7. Here, FIG. 8A is an explanatory diagram illustrating subject images captured by the imaging unit. FIG. 8A shows the subject images that are: a person image on the left front side; three person images on the right rear side; and two plant images on the right front side.

Figure 8B:
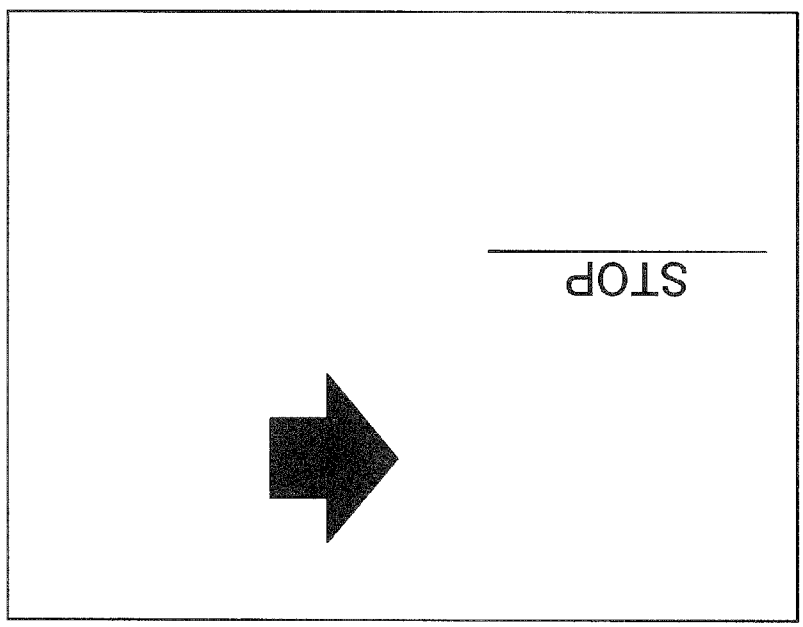
FIG. 8B is an explanatory diagram illustrating projection images to be projected on a projection region.

FIG. 8B is an explanatory diagram illustrating projection images to be projected on a projection region. FIG. 8B shows the projection images that are: an image showing an arrow on the front side; and an image showing a stop-line on the right rear side.

Figure 8C:
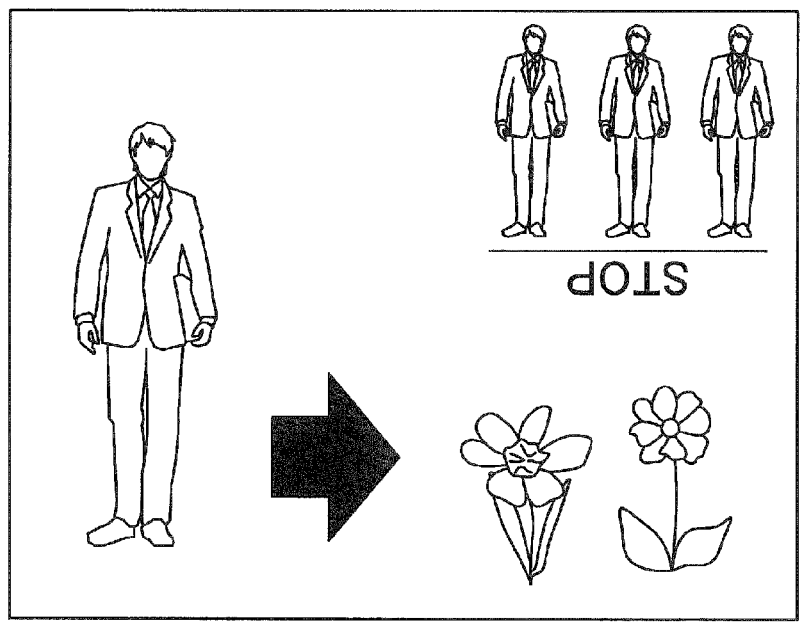
FIG. 8C is an explanatory diagram illustrating images seen by a user with the naked eyes.

FIG. 8C is an explanatory diagram illustrating images seen by the user with the naked eyes. FIG. 8C shows a state where the projection images are projected on the imaging regions. FIG. 8C shows: an image showing an arrow on the front side; and an image showing a stop-line on the right rear side. Projecting the projection images in this way can indicate, for the people taken in the subject images, for example, a direction in which the person on the left front side should move and a position at which the people on the right rear side should stop.

Figure 8D:
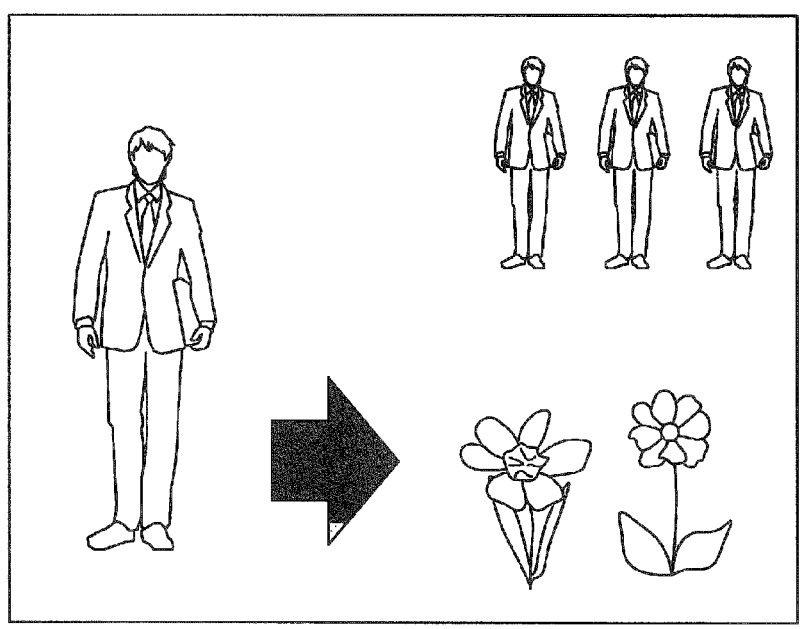
FIG. 8D is an explanatory diagram illustrating digital image data outputted from the imaging device in a case where images are projected by a projection method in FIG. 7.

FIG. 8D is an explanatory diagram illustrating digital image data outputted from the imaging device 320 in the case where the images are projected by using the projection method in FIG. 7. As described with reference to FIG. 7, the images are projected in the non-exposure periods for the imaging lines L from the first imaging line $L_1$ to the sixth imaging line $L_6$, and thus the projection images are not reflected on the digital image data. In other words, the projected images are not taken in an upper-half region of the digital image data. In contrast, the images are projected in the exposure periods for the imaging lines L from the seventh imaging line $L_7$ to the twelfth imaging line $L_{12}$, and thus the projected images are reflected on the digital image data. In other words, the projected images are taken in a lower-half region of the digital image data.

With reference to FIG. 8D, the image showing the stop-line projected on the right rear side is included in the upper-half region of the digital image data and thus is not taken in the digital image data. However, the image showing the arrow and projected on the front side is included in the lower-half region of the digital image data and thus is taken in the digital image data. At this time, the degree of taking the projection image in the digital image data depends on the imaging line L. The longer a period of time when the exposure period overlaps with the projection period of the image is, the darker the projection image taken in the digital image data is. In the examples illustrated in FIGS. 7 and 8D, the period of time when the exposure period overlaps with the projection period of the image increases in order from the seventh imaging line $L_7$ to the twelfth imaging line $L_{12}$ in the imaging lines L. In other words, in the example illustrated in FIG. 8D, the lower an area in the lower-half region of the digital image data is, the darker the projection image taken in the digital image data is.

As described above, when the imaging device is an image sensor such as a CMOS image sensor in which pixels have different exposure periods, the projected image or the like is taken in the captured image in the projection method in the reference example in which the image is projected on the entire imaging regions.

3. OPERATION EXAMPLE OF PROJECTOR ACCORDING TO EMBODIMENT OF PRESENT DISCLOSURE

Next, a description is given of an example of operation of the projector 1 according to an embodiment of the present disclosure.

[3-1. Explanation of Imaging Operation and Projection Operation]

Figure 9:
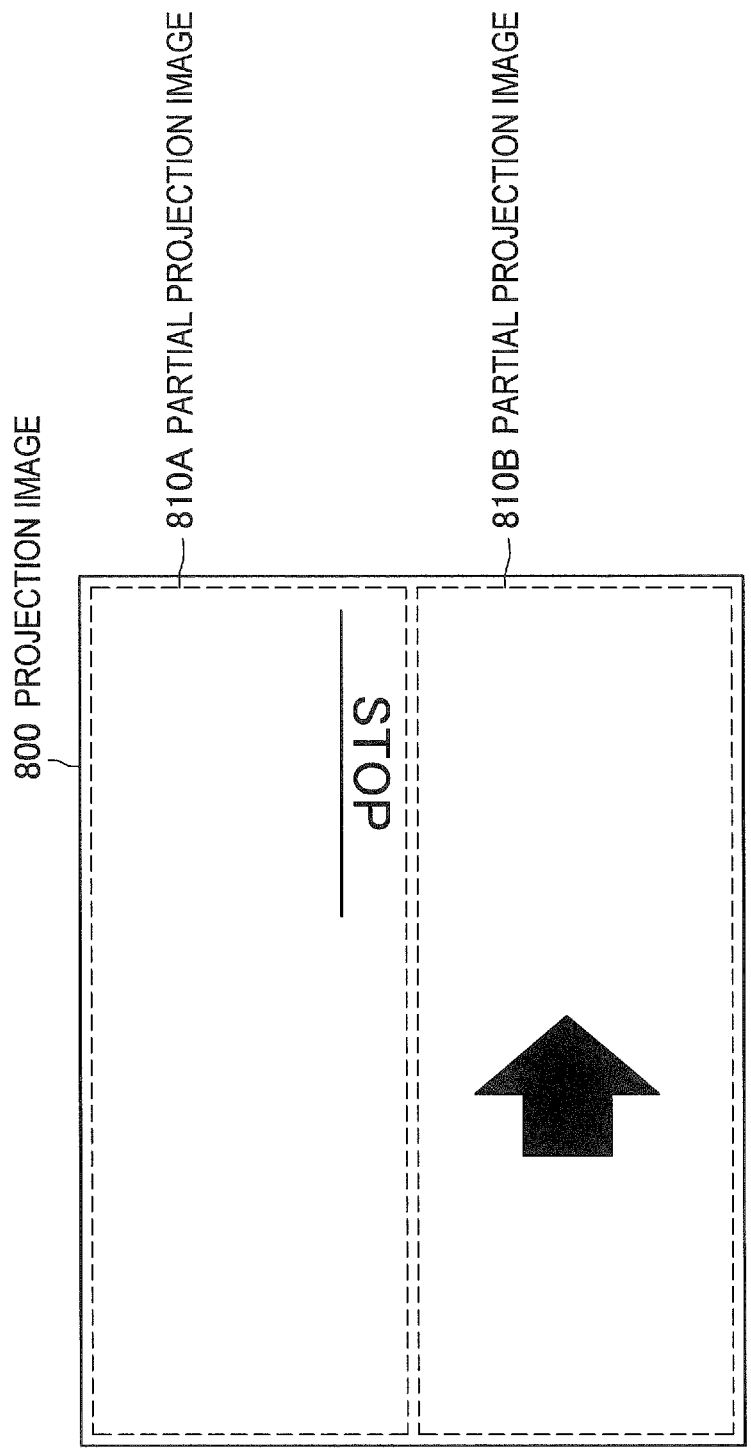
FIG. 9 is an explanatory diagram illustrating a projection example of a projection image according to the embodiment.

Firstly, imaging operation and projection operation of the projector 1 according to the present embodiment will be described with reference to FIGS. 9 to 11. FIG. 9 is an explanatory diagram illustrating an example of a projection image 800 of the projector 1 according to the present embodiment. With reference to FIG. 9, the projection image 800 is divided into a partial projection image 810A and a partial projection image 810B. The projector 1 according to the present embodiment projects the two partial projection images 810A and 810B in a switching manner.

Figure 10:
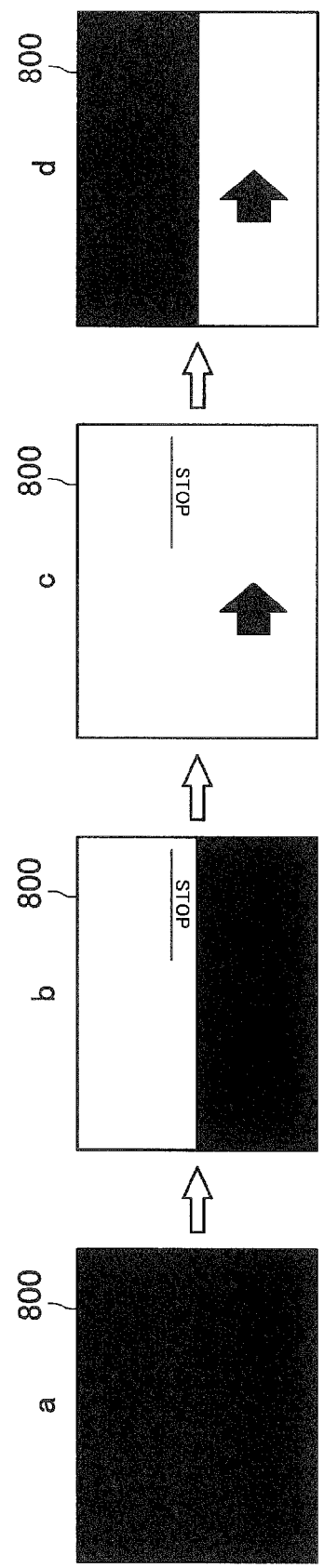
FIG. 10 is an explanatory diagram illustrating an example of switching between a display region and a non-display region of a projection image.

FIG. 10 is an explanatory diagram illustrating a projection example of the projection image 800 according to the present embodiment. The projection control unit 50 projects the partial projection images 810A and 810B in the switching manner, and thereby can switch projection regions. Note that blacked out regions in FIG. 10 are regions where no image is projected. These regions can be realized by using a not shown device that blocks light, such as a shutter, provided on the projection lens 410 side or on the light source 430 side of the display device 420 of the projection unit 40 illustrated, for example, in FIG. 5. Two shutters are provided in the vertical direction of the display device 420 to correspond to, for example, the partial projection images 810A and 810B. The projection control unit 50 can switch the projection regions by independently opening and closing the two shutters.

Note that the projector 1 according to the present embodiment is provided with the shutters ahead or behind the display device 420 and thereby switches the projection regions, but the embodiment of the present disclosure is not limited thereto. For example, the two light sources 430 can be provided for the partial projection images 810A and 810B, respectively, to switch the projection regions. In this case, the projection control unit 50 can switch the projection regions by independently driving the two light sources 430.

In FIG. 10a, the entire projection image 800 is blacked out, and the shutters corresponding to the respective partial projection images 810A and 810B are both in the closed state. In this case, even though light is emitted to the projection image 800 of the display device 420, no projection image is projected on the projection region. In FIG. 10b, only the lower-half region as the partial projection image 810B of the projection image 800 is blacked out, and only the shutter corresponding to the partial projection image 810B is in the closed state. If the projection image 800 in FIG. 10b is projected at this time, only the partial projection image 810A is projected on the projection region. In FIG.

10c, the partial projection images 810A and 810B are displayed, and the shutters corresponding to the respective partial projection images 810A and 810B are both in the opened state. Projecting the projection image 800 leads to the projection image projected on the projection regions as illustrated in FIG. 8C. In FIG. 10d, only the upper-half region as the partial projection image 810A of the projection image 800 is blacked out, and only the shutter corresponding to the partial projection image 810A is in the closed state. If the projection image 800 in FIG. 10d is projected at this time, only the partial projection image 810B is projected on the projection region.

In the present embodiment, the projection control unit 50 projects the partial projection images 810A and 810B in the switching manner using the projection pattern from FIGS. 10a to 10d, thereby switching the projection regions. Thus, it is possible to project an image in such a manner as to prevent part of the image from being taken in digital image data. Next, an operation example of imaging and projection by the projector 1 according to the present embodiment will be described with reference to FIG. 11.

Figure 11:
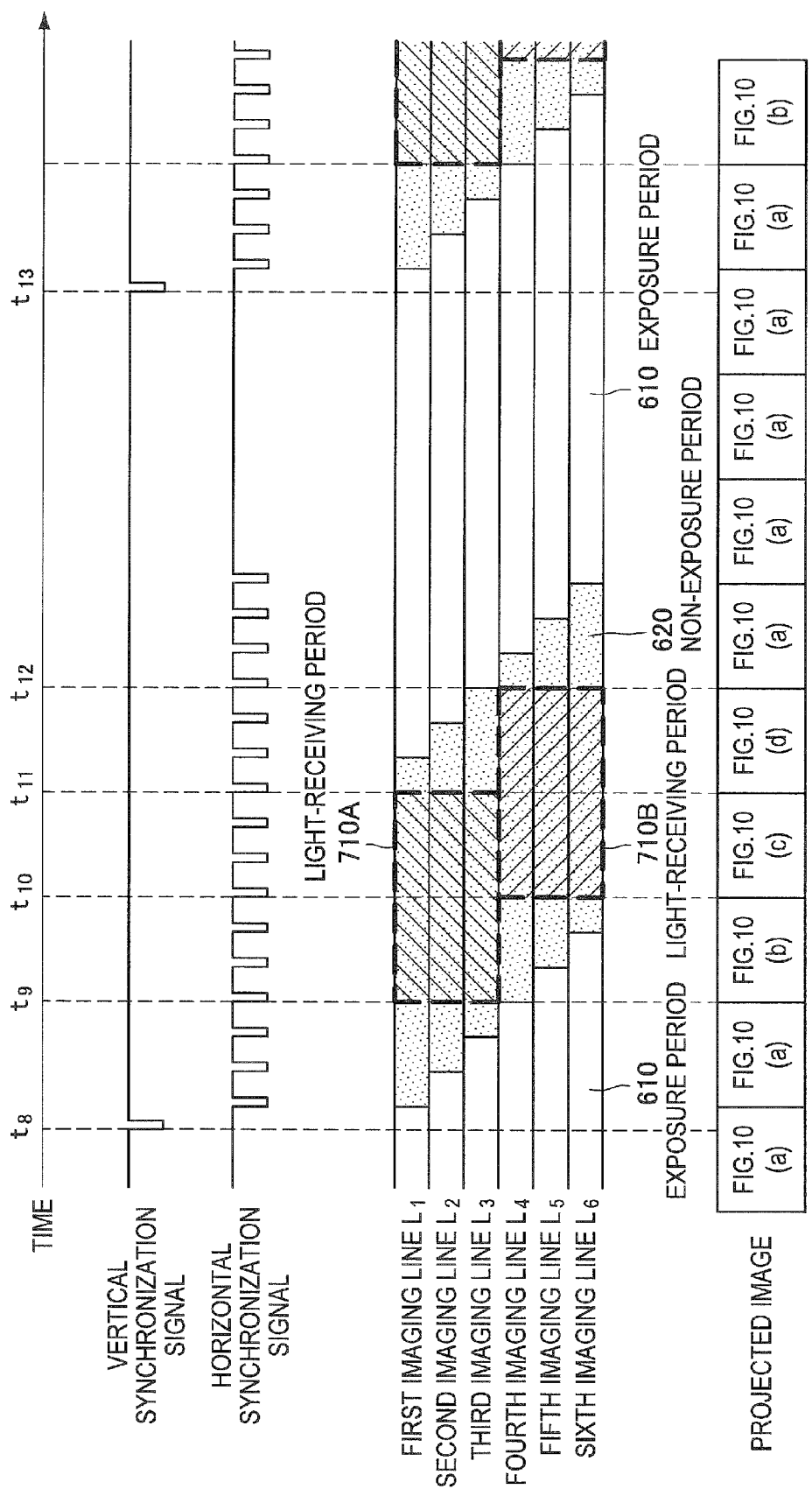
FIG. 11 is an explanatory diagram illustrating an operation example of imaging and irradiation by the imaging device according to the embodiment.

FIG. 11 is an explanatory diagram illustrating the operation example of imaging and projection by the projector 1 according to the present embodiment. In the example illustrated in FIG. 11, the imaging device 320 includes six imaging lines L from a first imaging line $L_1$ to a sixth imaging line $L_6$. The operation of the imaging device 320 is the same as in the example illustrated in FIG. 6.

The imaging unit 30 of the projector 1 according to the present embodiment captures an image based on a fall of a vertical synchronization signal at time $t_8$ and subsequent falls of the horizontal synchronization signal. Firstly, the projection control unit 50 projects the projection image 800 in FIG. 10a in a period between time $t_8$ that is timing of the fall of the vertical synchronization signal and time $t_9$. Since the period includes exposure periods of all of the imaging lines L, the projection control unit 50 projects the projection image 800 in FIG. 10a while performing control to prevent the image from being projected on imaging regions.

Subsequently, the projection control unit 50 projects the projection image 800 in FIG. 10b in a period between time $t_9$ and time $t_{10}$. The period includes exposure periods of the imaging lines L that are the fourth imaging line $L_4$ to the sixth imaging line $L_6$. For this reason, the projection control unit 50 projects the projection image in FIG. 10b showing only the partial projection image 810A and thereby projects the image on only the imaging regions of the first imaging line $L_1$ to the third imaging line $L_3$.

Further, the projection control unit 50 projects the projection image 800 in FIG. 10c in a period between time $t_{10}$ and time $t_{11}$. In the period, every imaging line L is in the non-exposure period. For this reason, the projection control unit 50 projects the projection image 800 in FIG. 10c displaying the partial projection images 810A and 810B.

Thereafter, the projection control unit 50 projects the projection image 800 in FIG. 10a in a period between time $t_{12}$ and time $t_{13}$ as in the period between time $t_8$ and time $t_9$. Since the period includes the exposure periods of all of the imaging lines L, the projection control unit 50 projects the projection image 800 in FIG. 10a while performing control to prevent an image from being projected on the imaging regions.

FIG. 11 shows a light-receiving period 710A and a light-receiving period 710B in which the projection of the projection image causes the imaging lines L to receive light for an image. Here, periods in which light for the partial projection images 810A and 810B are received are the light-receiving periods 710A and 710B, respectively. With reference to FIG. 11, both the light-receiving periods 710A and 710B are included in the non-exposure periods of the imaging lines L. This enables the image to be projected in such a manner as to prevent the image from being taken in the digital image data, like the subject image illustrated in FIG. 8A.

Here, it is preferable that the projection control unit 50 project an image at a frame rate that is an integral multiple of a frame rate of the imaging device 320 and to switch projection regions on a frame basis. In the example illustrated in FIG. 11, the length of one frame used by the imaging device 320 is equivalent to the length from time $t_8$ to time $t_{13}$, while the length of one frame of the image projected by the projection control unit 50 is equivalent to the length from time $t_9$ to time $t_{10}$. The projection control unit 50 projects the image at the frame rate as eight times higher than that used by the imaging device 320. At this time, the frame rates may be set in advance at predetermined values. The projection control unit 50 may determine the frame rate for the image projection based on the frame rate for the imaging device 320 detected by the control unit 20 or the imaging unit 30.

[3-2. Explanation of Methods for Controlling Imaging Operation and Projection Operation]

The operation of the projector 1 according to the present embodiment has heretofore been described. Next, methods for controlling the imaging operation and the projection operation of the projector 1 according to the present embodiment will be described with reference to FIGS. 12 and 13.

Figure 12:
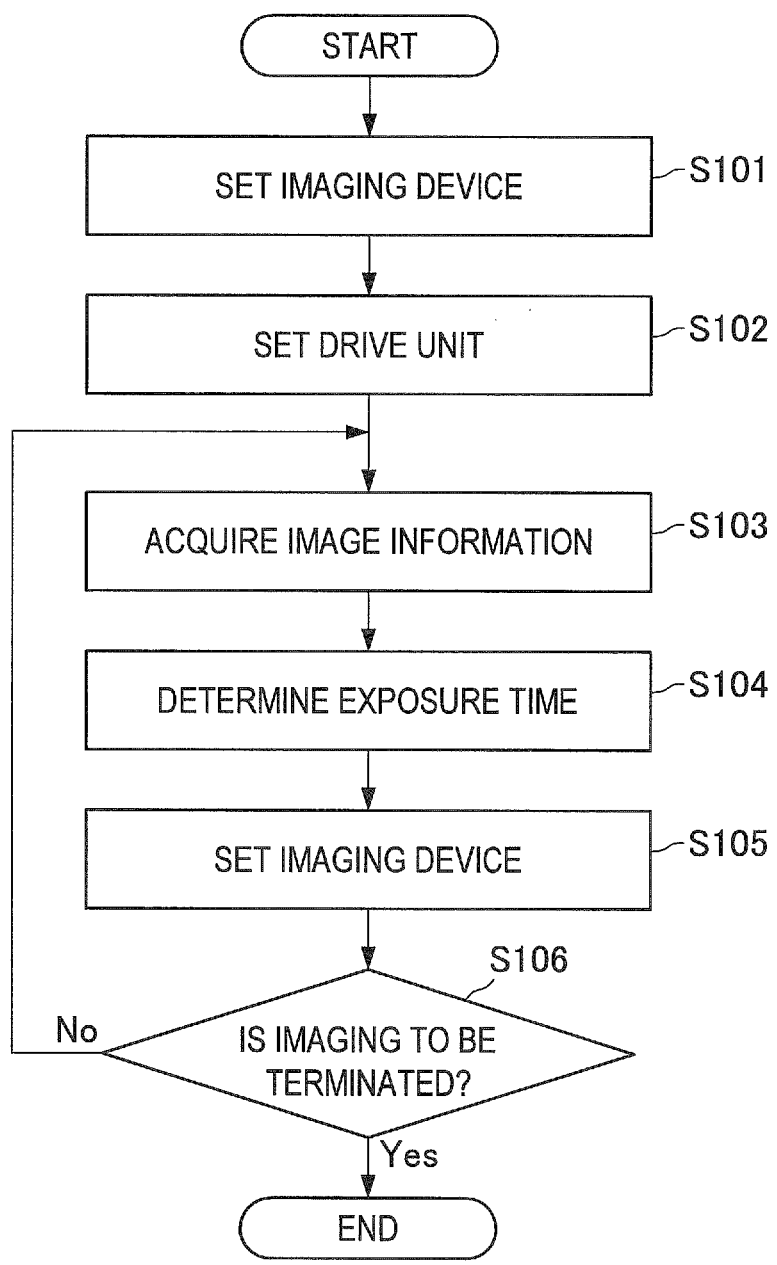
FIG. 12 is a flowchart illustrating an example of imaging processing according to the embodiment.

FIG. 12 is a flowchart illustrating the method for controlling the imaging operation of the projector 1 according to the present embodiment.

Firstly, when receiving an imaging start instruction from a not shown manipulation unit, the CPU 200 writes predetermined set values to the imaging device 320 through the communication unit 330 (S101). The predetermined set values include at least electronic shutter timing. The instruction from the manipulation unit is implemented based on touching, pressing, or the like of the manipulation unit by the user.

Next, the CPU 200 sets the drive unit 340 for generating vertical and horizontal synchronization signals (S102). After Step S102, the drive unit 340 transmits the vertical and horizontal synchronization signals to the imaging device 320. When receiving the vertical and horizontal synchronization signals, the imaging device 320 captures a subject image and outputs digital image data to the image generation unit 202.

Further, the CPU 200 reads image characteristics information acquired by the image generation unit 202 (S103). The image characteristics information includes at least brightness information of the image data.

Thereafter, the CPU 200 determines exposure time of each pixel 321 based on the image characteristics information (S104).

Next, through the communication unit 330, the CPU 200 sets electronic-shutter timing corresponding to the determined exposure time, in the imaging device 320 (S105). The imaging device 320 performs the imaging operation according to the electronic-shutter timing thus set.

Further, the CPU 200 judges whether the manipulation unit issues an imaging stop instruction (S106). If it is judged in Step S106 that an imaging stop instruction is not issued, the processing moves back to Step S103. If it is judged in Step S106 that an imaging stop instruction is issued, the CPU 200 stops the imaging operation to terminate the control over the imaging unit 30.

Figure 13:
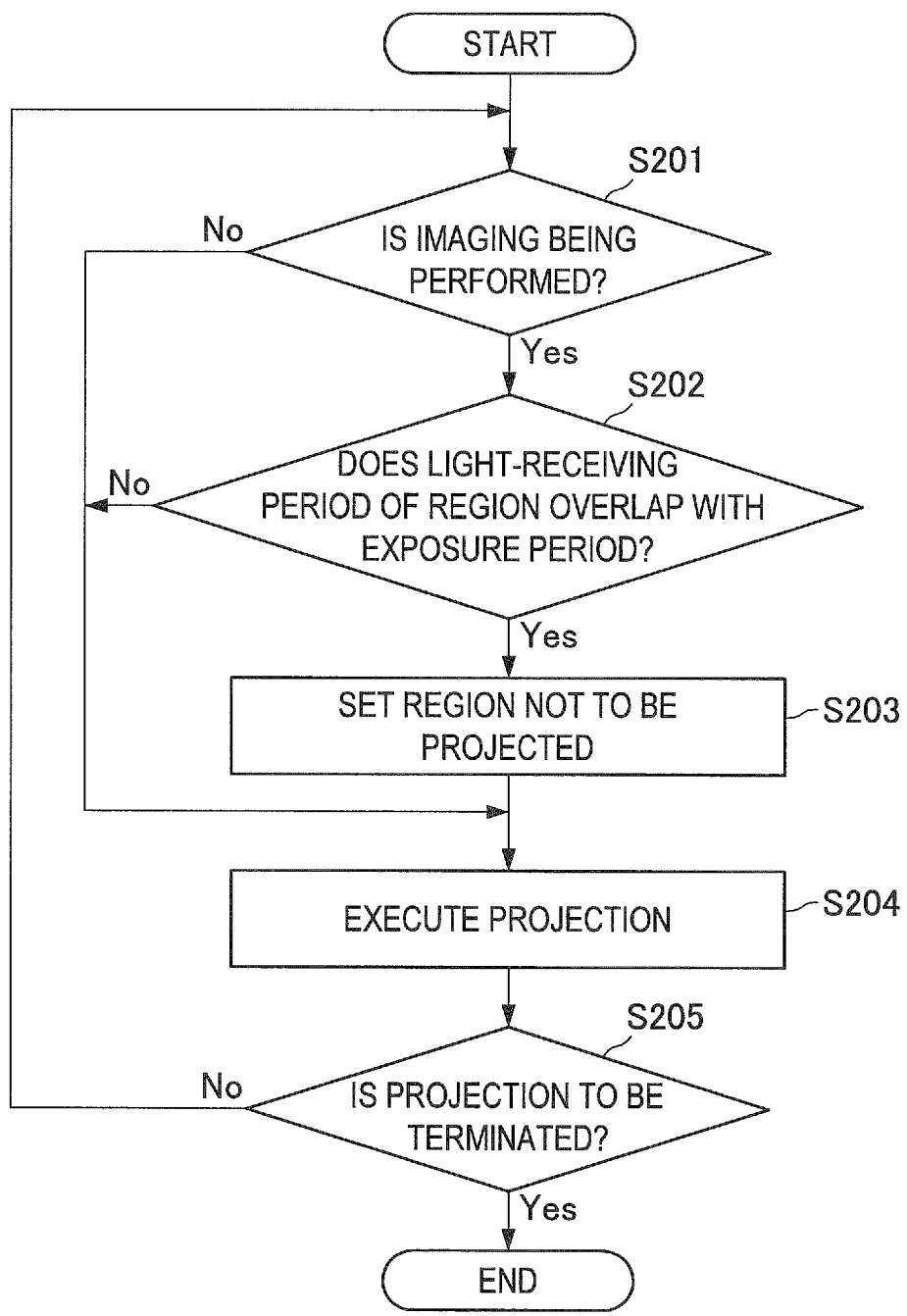
FIG. 13 is a flowchart illustrating an example of projection processing according to the embodiment.

FIG. 13 is a flowchart illustrating the method for controlling the projection operation of the projector 1 according to the present embodiment.

Firstly, when the manipulation unit issues a projection start instruction, the CPU 200 judges whether imaging is being performed (S201).

If it is judged in Step S201 that imaging is not being performed, the CPU 200 immediately projects a projection image (S204).

If it is judged in Step S201 that imaging is being performed, the CPU 200 judges whether light for a partial image to be projected is received in exposure periods different according to the imaging lines L of the imaging device 320 (S202).

If it is judged in Step S202 that light for the partial image to be projected is received in the exposure period, the CPU 200 causes the projection control unit 50 to perform setting to prevent the partial image from being projected (S203). Subsequently, the CPU 200 projects the projection image using the set conditions (S204).

If it is judged in Step S202 that light for the partial image to be projected is not received in the exposure period, the CPU 200 projects the projection image (S204).

Further, after Step S204, the CPU 200 judges whether the manipulation unit issues a projection stop instruction (S205). If it is judged in Step S205 that a projection stop instruction is not issued, the processing in Step S201 is repeated. If it is judged in Step S205 that a projection stop instruction is issued, the CPU 200 stops the image projection and terminates the control of the projection control unit 50.

Note that the processing performed by the CPU 200 in part or all of the steps illustrated in FIGS. 12 and 13 may be performed by the projection control unit 50.

The methods for controlling the imaging operation and the projection operation of the projector 1 according to the present embodiment have heretofore been described. The projector 1 according to the present embodiment switches projection regions by projecting the partial projection images 810A and 810B in the switching manner based on the exposure periods for the imaging lines L. This enables an image to be projected in such a manner as to prevent the image from being taken in digital image data resulting from the imaging, even in the imaging device 320, such as the CMOS image sensor, including the pixels 321 having different exposure periods.

In the present embodiment, an image is projected in such a manner as to prevent the image from being taken in digital image data resulting from imaging. For example, when a subject image is a person, this makes it possible to appropriately issue an indicator or the like for a location, operation, or the like for a subject image. In addition, an imaging range is indicated as a projection image, and thereby it is possible to present the imaging range for the subject image person.

4. MODIFICATIONS

4-1. First Modification

Figure 14:
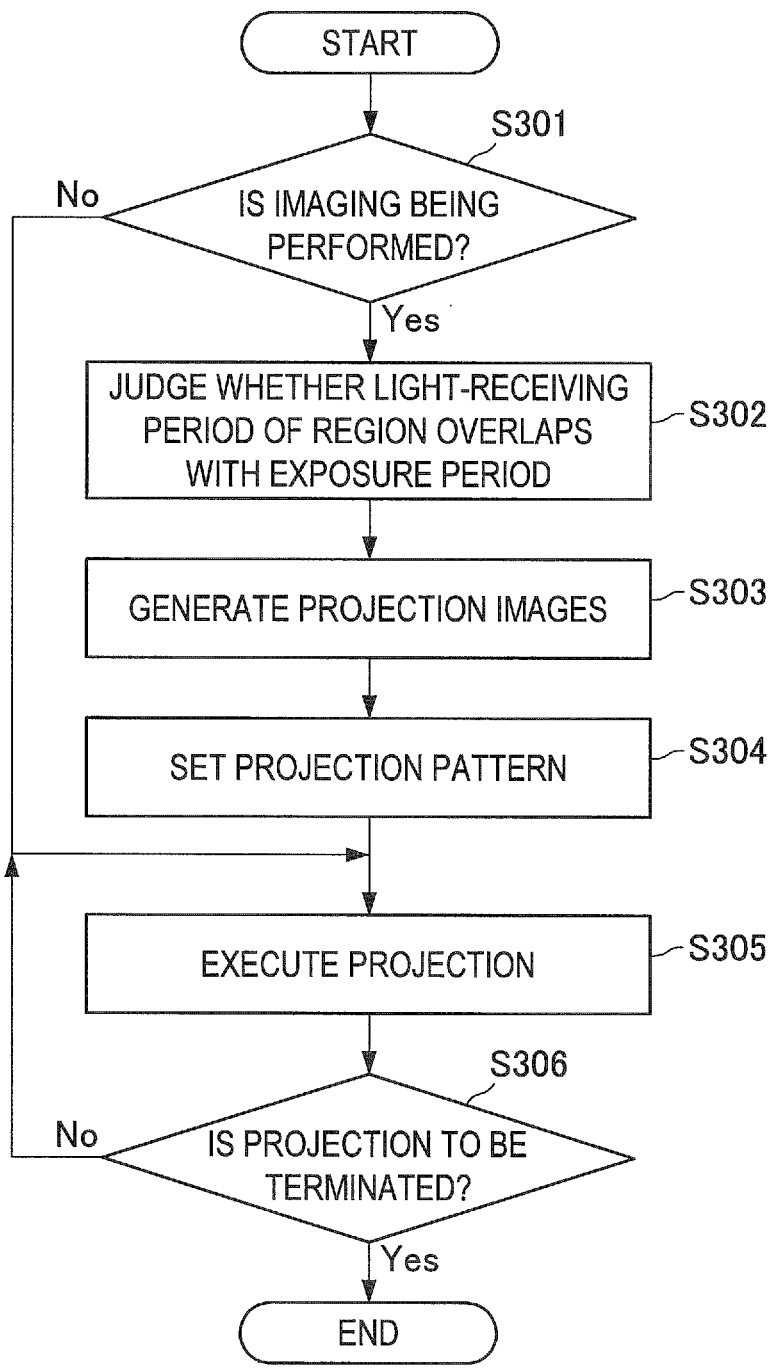
FIG. 14 is a flowchart illustrating an example of projection-image generation processing by the projector according to the embodiment in a first modification.

Next, a first modification of the projector 1 according to an embodiment of the present disclosure will be described with reference to FIG. 14. FIG. 14 is a flowchart illustrating an example of projection-image generation processing by the projector 1 according to the embodiment in the first modification. In the modification, a plurality of projection images having different projection regions are generated. Note that the device configuration and the imaging processing method for the projector 1 according to the modification are the same as those in the aforementioned embodiment.

The projection unit 40 according to the modification is a projector module that projects images on projection regions by emitting light from a light source through a display device. Accordingly, for example, to prevent part of the images from being projected, part of the regions which is not intended to be projected is displayed in black, and thereby the images except the black region are projected on the projection regions. Thus, in the modification, the projection regions are switched by changing a non-display region of the corresponding projection image into black, instead of using a shutter or the like.

Firstly, when the manipulation unit issues a projection start instruction, the CPU 200 judges whether imaging is being performed (S301).

If it is judged in Step S301 that imaging is not being performed, the CPU 200 immediately executes projection of each projection image (S305).

If it is judged in Step S301 that imaging is being performed, the CPU 200 obtains a region where light for the projection image is received in each exposure period of the imaging lines L for each projection frame of the projection image (S302). Subsequently, the CPU 200 generates a plurality of projection image data pieces having the obtained regions that are black and the other regions provided for an image to be projected, and writes the projection image data pieces to the memory 210 (S303). Further, the CPU 200 causes the projection control unit 50 to set the addresses of the plurality of projection image data pieces stored in the memory 210 and the order of reading the projection image data pieces (S304).

After Step S304, the CPU 200 projects the projection images of the projection image data pieces according to the projection pattern set in Step S304 (S305).

Thereafter, the CPU 200 judges whether the manipulation unit issues a projection stop instruction (S306). If it is judged in Step S306 that a projection stop instruction is not issued, the processing in Step S301 is repeated. If it is judged in Step S306 that a projection stop instruction is issued, the CPU 200 stops the projection of the images and terminates the control of the projection control unit 50.

Note that the processing performed by the CPU 200 in part or all of the steps illustrated in FIG. 14 may be performed by the projection control unit 50.

The description has heretofore been given of the modification in which the plurality of projection images having different projection regions are generated. In the modification, the plurality of projection images having the different projection regions are generated, and are projected in such a manner that the projection regions are switched. This makes it possible to switch the projection regions even in a simple device configuration without a shutter or the like.

4-2. Second Modification

Figure 15:
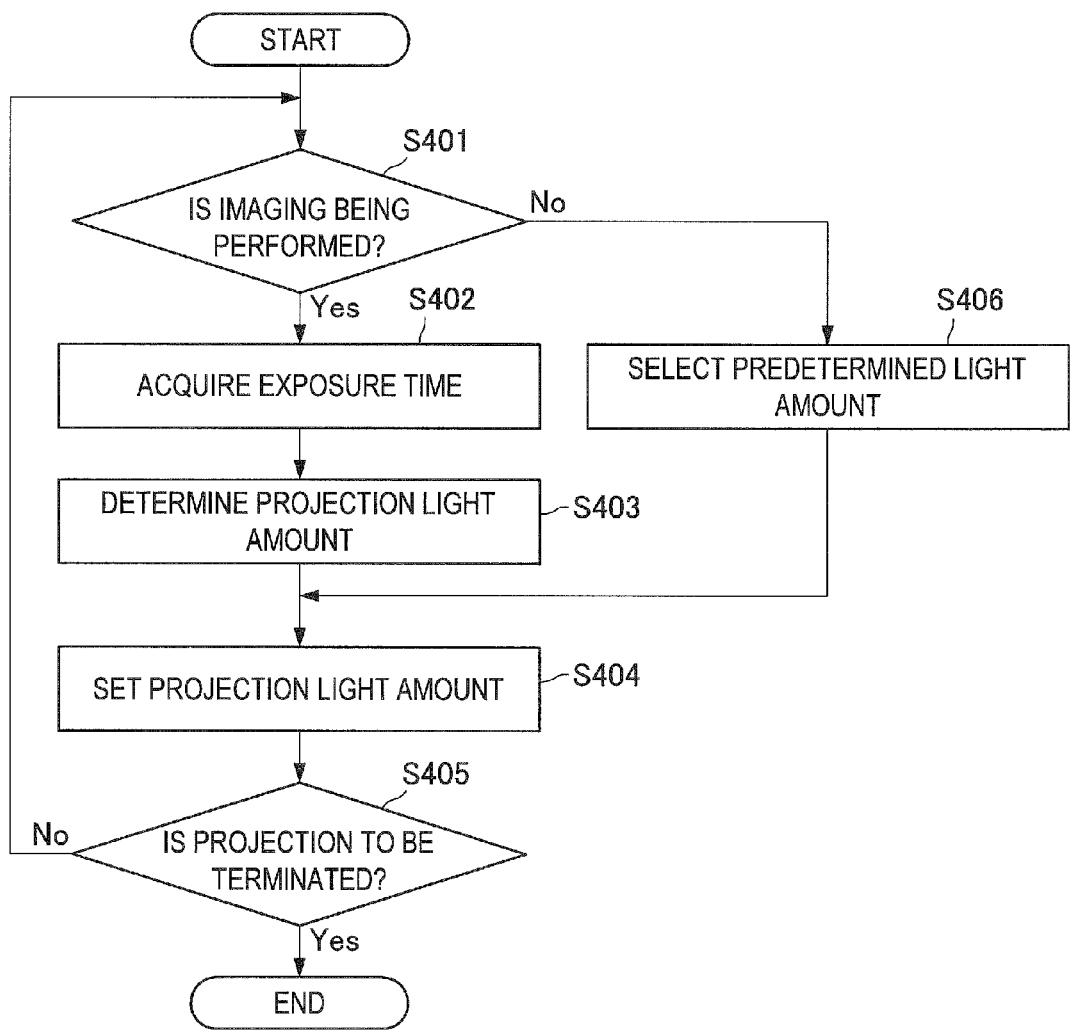
FIG. 15 is a flowchart illustrating an example of light-amount adjustment processing of the projection image by the projector according to the embodiment in a second modification.

Next, a second modification of the projector 1 according to the embodiment will be described with reference to FIG. 15. FIG. 15 is a flowchart illustrating an example of controlling a projection light amount of the projector 1 according to the embodiment in the second modification. Note that the device configuration and the imaging processing method for the projector 1 according to the modification are the same as those in the aforementioned embodiment.

In the projector 1 according to the modification, the longer an exposure time of each imaging line L of the imaging device 320 is, the shorter a period in which projection unit 40 projects a projection image is. For this reason, the shorter the period for projecting the projection image is, the more darkly the projected image is seen. Accordingly, a light amount of the light source 430 emitting light is changed according to the length of the exposure period of the imaging line L in the modification. In other words, in the modification, a projection light amount used by the projection unit 40 for projecting the projection image is increased as an exposure time of the imaging line L of the imaging device 320 becomes longer, and thereby it is possible to keep the brightness of the projected image to be seen.

Firstly, when the manipulation unit issues a projection start instruction, the CPU 200 judges whether imaging is being performed (S401).

If it is judged in Step S401 that imaging is not being performed, the CPU 200 in advance selects an already set predetermined light amount (S406).

If it is judged in Step S401 that imaging is being performed, the CPU 200 acquires electronic-shutter timing that is set in the imaging device 320 or an exposure time that is determined by the CPU 200 and used at the time of determining the electronic-shutter timing (S402). Subsequently, the CPU 200 determines a projection light amount based on the acquired shutter timing or the exposure time (S403). In this case, the determination is made so that the projection light amount can be proportional to, for example, the exposure time, for example, so that a longer exposure time can lead to a larger projection light amount.

Thereafter, the CPU 200 sets, in the projection control unit 50, the projection light amount selected in Step S406 or the projection light amount determined in Step S403, and projects the projection image (S404).

Further, after Step S404, the CPU 200 judges whether the manipulation unit issues a projection stop instruction (S405). If it is judged in Step S405 that a projection stop instruction is not issued, the processing in Step S401 is repeated. If it is judged in Step S405 that a projection stop instruction is issued, the CPU 200 stops the projection of the image and terminates the control of the projection control unit 50.

Note that the processing performed by the CPU 200 in part or all of the steps illustrated in FIG. 15 may be performed by the projection control unit 50.

The description has heretofore been given of the modification in which the projection light amount is changed according to the exposure time. In the modification, the projection light amount is changed according to the exposure time for image projection. Even in a case, for example, where a long exposure time leads to a short projection period, the increasing of the projection light amount helps the user to see the image easily.

5. CONCLUSION

The preferable embodiment has heretofore been described in detail with reference to the appended drawings. The projector 1 according to the embodiment switches the projection regions based on the exposure period of the corresponding imaging line L. This enables an image to be projected in such a manner as to prevent the image from being taken in captured digital image data, even in the imaging device 320 such as the CMOS image sensor including the pixels 321 having different exposure periods.

It should be understood by those skilled in the art that various modifications, combinations, sub-combinations and alterations may occur depending on design requirements and other factors insofar as they are within the scope of the appended claims or the equivalents thereof.

For example, the aforementioned embodiment describes, as a method for emitting light, a method by which the projection unit that is a projector module projects an image, but the embodiment of the present disclosure is not limited to the example. For example, light may be emitted to an imaging region by using a laser light source or the like. At this time, the emitted light causes a reference line, a symbol, character information, or the like to be displayed on the imaging region, the reference line indicating the imaging region, the symbol and the character information being used for an instruction for the location or operation of a subject image. One of the CPU 200 and the irradiation control unit switches regions irradiated with the light in the same manner as in the aforementioned switching of the projection regions.

In addition, the projector 1 includes the imaging unit 30 in the aforementioned embodiment, but the embodiment of the present disclosure is not limited to the example. For example, the projector 1 may include an imaging apparatus having the imaging unit 30, separately from the projector 1.

In addition, the projection image 800 is divided into the two images that are the partial projection images 810A and 810B in the aforementioned embodiment, but the embodiment of the present disclosure is not limited to the example. For example, the projector 1 may divide the projection image 800 into three or more regions based on the imaging lines L.

In addition, the embodiment of the present disclosure may include a program for causing the irradiation device to function and a nonvolatile medium having the program recorded therein.

Additionally, the present technology may also be configured as below:

(1) An irradiation device including:
an irradiation unit configured to emit light; and
an irradiation control unit configured to switch irradiation regions irradiated with the light by the irradiation unit according to a synchronization signal for controlling an exposure period of a pixel of an imaging device of an imaging unit.

(2) The irradiation device according to (1),
wherein the imaging unit causes a plurality of the pixels to be exposed to light in different exposure periods, and
wherein the irradiation control unit switches the irradiation regions based on imaging regions used for imaging by the pixels and the exposure periods of the pixels.

(3) The irradiation device according to (2),
wherein the irradiation control unit switches the irradiation regions to emit the light to the imaging regions of the pixels that are in non-exposure periods.

(4) The irradiation device according to any one of (1) to (3),
wherein the irradiation unit projects an image on the irradiation regions by emitting the light.

(5) The irradiation device according to (4),
wherein the irradiation control unit switches the irradiation regions by causing the irradiation unit to project one of a display region and a non-display region of the image in a switching manner.

(6) The irradiation device according to (5),
wherein the non-display region results from region replacement in the image with a black region by the irradiation control unit.

(7) The irradiation device according to any one of (4) to (6), wherein the irradiation unit projects the image at a frame rate that is an integral multiple of a frame rate used for the imaging unit.

(8) The irradiation device according to any one of (1) to (7), wherein the irradiation control unit changes an amount of light from the irradiation unit based on a length of the exposure period of the pixel.

(9) The irradiation device according to any one of (1) to (8), further including an imaging unit having the irradiation regions included in imaging regions and configured to output the synchronization signal to the irradiation control unit.

(10) An irradiation method including:

emitting light; and switching irradiation regions irradiated with the light according to a synchronization signal for controlling an exposure period of a pixel of an imaging device of an imaging unit.

(11) A program for causing a computer to implement:

emitting light; and switching irradiation regions irradiated with the light according to a synchronization signal for controlling an exposure period of a pixel of an imaging device of an imaging unit.

What is claimed is:

1. An irradiation device, comprising:

a light source configured to emit light; and a central processing unit (CPU) configured to switch irradiation between a first region of an irradiation region and a second region of the irradiation region based on a first exposure period of a first pixel of a plurality of pixels of an imaging device of an imaging unit, wherein one of the first region or the second region is irradiated with the light based on a synchronization signal, wherein the first region and the second region are obtained by division of the irradiation region, and wherein the first exposure period of the first pixel is a time period from a first time of reset of the first pixel to a second time of output of pixel information.

2. The irradiation device according to claim 1, wherein the imaging unit is configured to cause each of the plurality of pixels to be exposed to the light in a second exposure period that is different for each of the plurality of pixels, and wherein the CPU is further configured to switch the irradiation between the first region and the second region based on imaging regions used by the plurality of pixels and the second exposure period of each of the plurality of pixels.

3. The irradiation device according to claim 2, wherein the CPU is further configured to switch the irradiation between the first region and the second region to emit the light to the imaging regions of the plurality of pixels that are in non-exposure periods.

4. The irradiation device according to claim 1, wherein the CPU is further configured to project an image on the irradiation region based on emission of the light.

5. The irradiation device according to claim 4, wherein the CPU is further configured to switch the irradiation between the first region and the second region by projection of one of a display region or a non-display region of the image in a switching manner.

6. The irradiation device according to claim 5, wherein the non-display region corresponds to a blacked-out region in the image.

7. The irradiation device according to claim 4, wherein the CPU is further configured to project the image at a first frame rate that is an integral multiple of a second frame rate used for the imaging unit.

8. The irradiation device according to claim 1, wherein the CPU is further configured to change an amount of the light from the light source based on a length of the first exposure period of the first pixel.

9. The irradiation device according to claim 1, further comprising the imaging unit, wherein the imaging unit comprises the irradiation region included in imaging regions, and the imaging unit is configured to output the synchronization signal.

10. The irradiation device according to claim 1, wherein the CPU is further configured to project an image on the first region, wherein a first frame rate of the projected image is greater than a second frame rate used for the imaging unit.

11. The irradiation device according to claim 1, wherein the CPU is further configured to project an image on the first region such that a projection period of the image overlaps with a non-exposure period of each of the plurality of pixels of the imaging device.

12. An irradiation method, comprising:

emitting light; and switching irradiation between a first region of an irradiation region and a second region of the irradiation region based on an exposure period of a pixel of an imaging device of an imaging unit, wherein one of the first region or the second region is irradiated with the light based on a synchronization signal, wherein the first region and the second region are obtained by dividing the irradiation region, and wherein the exposure period of the pixel is a time period from a first time of reset of the pixel to a second time of output of pixel information.

13. A non-transitory computer-readable storage medium having stored thereon, computer-executable instructions for causing a computer to execute operations, the operations comprising:

emitting light; and switching irradiation between a first region of an irradiation region and a second region of the irradiation region based on an exposure period of a pixel of an imaging device of an imaging unit, wherein one of the first region or the second region is irradiated with the light based on a synchronization signal, wherein the first region and the second region are obtained by dividing the irradiation region, and wherein the exposure period of the pixel is a time period from a first time of reset of the pixel to a second time of output of pixel information.

* * * * *